United States Patent
Li et al.

(10) Patent No.: US 8,811,041 B2
(45) Date of Patent: Aug. 19, 2014

(54) POWER SUPPLY, CONTROLLER THEREOF AND CONTROL METHOD FOR CONTROLLING POWER SUPPLY

(75) Inventors: Kuang Feng Li, Chupei (TW); Kuo Chi Liu, Chupei (TW); I-Fan Chen, Chupei (TW); Yen-Te Lee, Chupei (TW)

(73) Assignee: Richtek Technology Corp., Hsinchu (TW)

( * ) Notice: Subject to any disclaimer, the term of this patent is extended or adjusted under 35 U.S.C. 154(b) by 231 days.

(21) Appl. No.: 13/477,054

(22) Filed: May 22, 2012

(65) Prior Publication Data

US 2013/0051085 A1 Feb. 28, 2013

(30) Foreign Application Priority Data

Aug. 24, 2011 (TW) .............................. 100130210 A

(51) Int. Cl.
*H02M 3/335* (2006.01)
*H02M 1/42* (2007.01)
*H02M 1/00* (2006.01)

(52) U.S. Cl.
CPC ...... *H02M 1/4225* (2013.01); *H02M 2001/007* (2013.01); *H02M 3/33523* (2013.01); *H02M 2001/0003* (2013.01); *Y02B 70/126* (2013.01)
USPC ..................................... 363/21.07; 363/21.08

(58) Field of Classification Search
CPC ................ H02M 2001/007; H02M 2001/0003
USPC ....................... 363/21.07–21.09, 21.15–21.17
See application file for complete search history.

(56) References Cited

U.S. PATENT DOCUMENTS

| | | | | |
|---|---|---|---|---|
| 4,763,236 A | * | 8/1988 | Usui | 363/19 |
| 6,028,776 A | * | 2/2000 | Ji et al. | 363/21.05 |
| 6,125,046 A | * | 9/2000 | Jang et al. | 363/21.15 |
| 7,119,499 B2 | * | 10/2006 | Ishigaki et al. | 315/291 |
| 2002/0125867 A1 | * | 9/2002 | Choo et al. | 323/282 |
| 2005/0007088 A1 | * | 1/2005 | Yang et al. | 323/283 |
| 2005/0128773 A1 | * | 6/2005 | Yang et al. | 363/21.01 |
| 2006/0221650 A1 | * | 10/2006 | Yamada | 363/21.01 |
| 2007/0076448 A1 | * | 4/2007 | Usui | 363/21.01 |
| 2007/0133234 A1 | * | 6/2007 | Huynh et al. | 363/20 |
| 2009/0257251 A1 | * | 10/2009 | Su et al. | 363/21.15 |
| 2009/0267583 A1 | * | 10/2009 | Hsu et al. | 323/284 |
| 2010/0002480 A1 | * | 1/2010 | Huynh et al. | 363/90 |
| 2010/0061126 A1 | * | 3/2010 | Huynh et al. | 363/21.12 |
| 2010/0067259 A1 | * | 3/2010 | Liu | 363/21.01 |
| 2010/0135050 A1 | * | 6/2010 | Sonobe | 363/21.07 |
| 2011/0038180 A1 | * | 2/2011 | Yang | 363/17 |
| 2011/0085354 A1 | * | 4/2011 | Wang et al. | 363/21.02 |
| 2011/0148319 A1 | * | 6/2011 | Terazawa | 315/291 |

(Continued)

*Primary Examiner* — Timothy J Dole
*Assistant Examiner* — Yusef Ahmed
(74) *Attorney, Agent, or Firm* — Chun-Ming Shih

(57) ABSTRACT

A power supply includes a first circuit, a second circuit, a feedback circuit and a controller. The first circuit has a first switch, and the second circuit has a second switch. The first circuit transforms an input voltage to a middle voltage, and the second circuit transforms the middle voltage to an output voltage. The feedback circuit electrically connects to the controller and the output voltage respectively. The controller includes a first sub-control unit and a second sub-control unit. The first sub-control unit electrically connects to the first switch and the second sub-control unit electrically connects to the second switch. The controller generates a compensation voltage signal for the first sub-control unit and the second sub-control unit to control the first switch and the second switch.

26 Claims, 15 Drawing Sheets

(56) References Cited

U.S. PATENT DOCUMENTS

| | | | |
|---|---|---|---|
| 2012/0014141 A1* | 1/2012 | Nania et al. | 363/21.09 |
| 2012/0147631 A1* | 6/2012 | Nate | 363/21.15 |
| 2012/0243269 A1* | 9/2012 | Ren et al. | 363/21.12 |
| 2012/0314456 A1* | 12/2012 | Lanni | 363/21.02 |
| 2012/0314457 A1* | 12/2012 | Reinberger et al. | 363/21.02 |

* cited by examiner

POWER SUPPLY, CONTROLLER THEREOF AND CONTROL METHOD FOR CONTROLLING POWER SUPPLY

This application claims the benefit of the filing date of Taiwan Patent Application No. 100130210, filed on Aug. 24, 2011, in the Taiwan Intellectual Property Office, the disclosure of which is incorporated herein in its entirety by reference.

BACKGROUND OF THE INVENTION

1. Field of Invention

The present invention relates to a power supply, a controller of the power supply, and a method for controlling the power supply, in particular, relates to those are controlled by a single feedback signal.

2. Related Art

The level of the power factor is a principal standard to evaluate the performance of a power supply, and the level is also required by several relative specifications. There are two methods of the traditional power supply to promote the power factor in general, and the first one is to add a valley-fill circuit as the passive power factor corrector (PFC) circuit after rectifying the AC power. The aforesaid method is easy and inexpensive, however, the passive circuit of this method is unable to trace and regulate the phases of the current and the voltage, so the improvement of the power factor is finite.

The second method utilizes a combination of two various functional circuits to promote the power factor. In the first place, an active PFC circuit is arranged after rectifying the AC power. Then a power circuit for DC to DC conversion is configured after the PFC circuit. The PFC circuit promotes the power factor, and the power circuit provides the function to amplify the power.

The front stage circuit, active PFC circuit, and the rear stage circuit, power circuit for DC to DC conversion, are controlled separately by the independent integrated circuits (IC) or by the independent control circuits in the traditional circuit design. Take boost PFC circuit for example, an IC fetches the wave form that is received by the PFC circuit after rectifying the AC voltage, and the IC takes the output voltage of the PFC circuit as the feedback signal. Then the IC obtains a reference voltage in proportion to an input voltage of the PFC circuit via process including comparison, compensation, and calculation done by the IC. Thereafter, the IC compares the reference voltage with a current of a switch of the PFC circuit to determine whether the IC can turn off the switch or not. The IC also detects the zero current of the PFC circuit to turn on the switch of the PFC circuit. To turn on and off the switch of the PFC circuit, an inphase input current that follows the input voltage variation is obtained to promote the power factor.

Moreover, a flyback converter circuit is a common choice as the power circuit of the rear stage circuit because the flyback converter circuit can both boost and buck the voltage to convert the voltage. In addition, the flyback converter circuit comprises a transformer to isolate the input and the output, further the transformer converts the polarization.

Nevertheless, the flyback converter circuit is controlled by an IC, so the IC produces a control signal to control the switch of the flyback converter circuit. The control signal is produced according to the feedback signal resulted from the output voltage and the other process such as comparison. For the sake of better performance of the power factor and the power, various control circuits and controllers are required in general to control the PFC circuit and the power circuit individually.

Consequently, the whole design of the circuit is more complicated, accordingly, requisite elements, material or size of the circuit increase and enlarge.

SUMMARY OF THE INVENTION

The present invention provides a power supply to solve the aforesaid problems of the traditional circuit design. The traditional circuit design is more complicated, further requires more elements and space, so the traditional circuit design leads to higher cost and larger size of the product. Under the premise that gives consideration to both the power factor and the output power, the present invention provides a power supply to solve the problems of the traditional circuit design, and the power supply features a design with the power supply is controlled by the single feedback of the output.

The current invention discloses a power supply including a first circuit, a second circuit, a feedback circuit and a controller. The first circuit has a first switch to convert an input voltage to a middle voltage. Further, the second circuit has a second switch to convert the middle voltage to an output voltage.

The feedback circuit electrically connects to the controller and the output voltage. The controller has a first sub-control unit and a second sub-control unit. The first sub-control unit has an initial setting and electrically connects to the first switch. The second sub-control unit electrically connects to the second switch.

The controller produces a corresponding compensation voltage signal according to the output voltage, then the first sub-control unit generates a first control signal according to the initial setting and the compensation voltage signal, further the first sub-control unit transmits the first control signal to the first switch. Also, the second sub-control unit produces a second control signal according to the compensation voltage signal and transmits it to the second switch.

The controller of the present invention is applicable to a power supply including a first circuit, a second circuit, and a feedback circuit. The first circuit has a first switch to convert an input voltage to a middle voltage. Further, the second circuit has a second switch to convert the middle voltage to an output voltage. The feedback circuit electrically connects to the controller and the output voltage.

The controller of the present invention includes a first sub-control unit and a second sub-control unit. The first sub-control unit has an initial setting and electrically connects to the first switch. The second sub-control unit electrically connects to the second switch.

The controller produces a compensation voltage signal corresponding to the output voltage, then the first sub-control unit generates a first control signal according to both the initial setting and the compensation voltage signal, further the first sub-control unit transmits the first control signal to the first switch. Also, the second sub-control unit produces a second control signal and transmits it to the second switch.

The control method of the power supply of the present invention includes the following steps. First, a feedback circuit produces a feedback signal corresponding to the variation of an output voltage. Then a controller detects the feedback signal to generate a compensation voltage signal correspondingly. Further, a first sub-control unit of the controller produces a first control signal to control a first switch according to both the initial setting and the compensation voltage signal. In addition, a second sub-control unit of the controller produces a second control signal to control a second switch according to the compensation voltage signal.

The present invention can control both the PFC circuit and the power circuit simultaneously by the single output feedback signal. The present invention not only can maintain enough level of the power factor but also keep adequate power output, also, reduce the loss. The present invention simplifies the circuit design, also reduces the components consumption, and decreases the size of the circuit board or product.

Further objects, embodiments and advantages are apparent in the drawings and in the detailed description which follows.

DETAIL DESCRIPTION OF THE INVENTION

Figure 1:
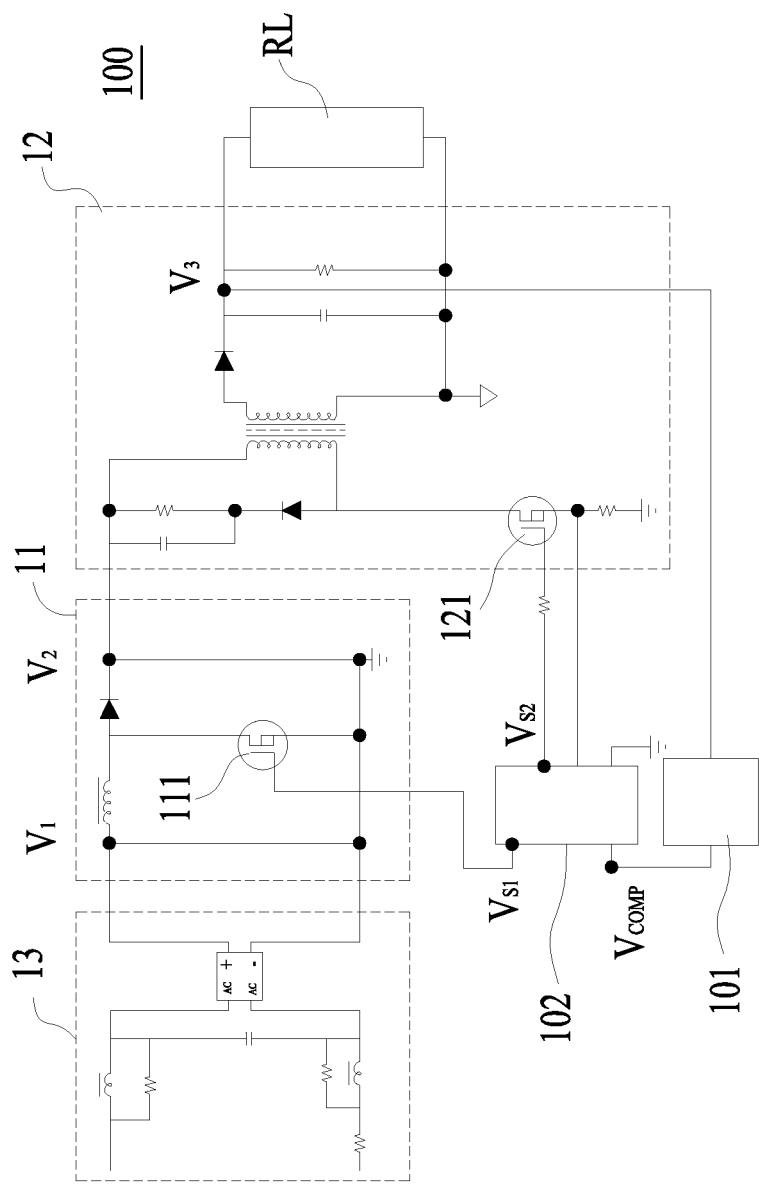
FIG. 1 illustrates the power supply of the first embodiment of the present invention.

FIG. 1 illustrates the power supply 100 of the first embodiment of the present invention. Referring to FIG. 1, the power supply 100 includes a first circuit 11, a second circuit 12, a feedback circuit 101 and a controller 102.

The first circuit 11 has a first switch 111 to convert an input voltage $V_1$ to a middle voltage $V_2$. Further, the second circuit 12 has a second switch 121 to convert the middle voltage $V_2$ to an output voltage $V_3$. The feedback circuit 101 electrically connects to the controller 102 and the output voltage $V_3$ separately. Consequently, the controller 102 produces a corresponding compensation voltage signal $V_{COMP}$ according to the output voltage $V_3$.

Figure 2:
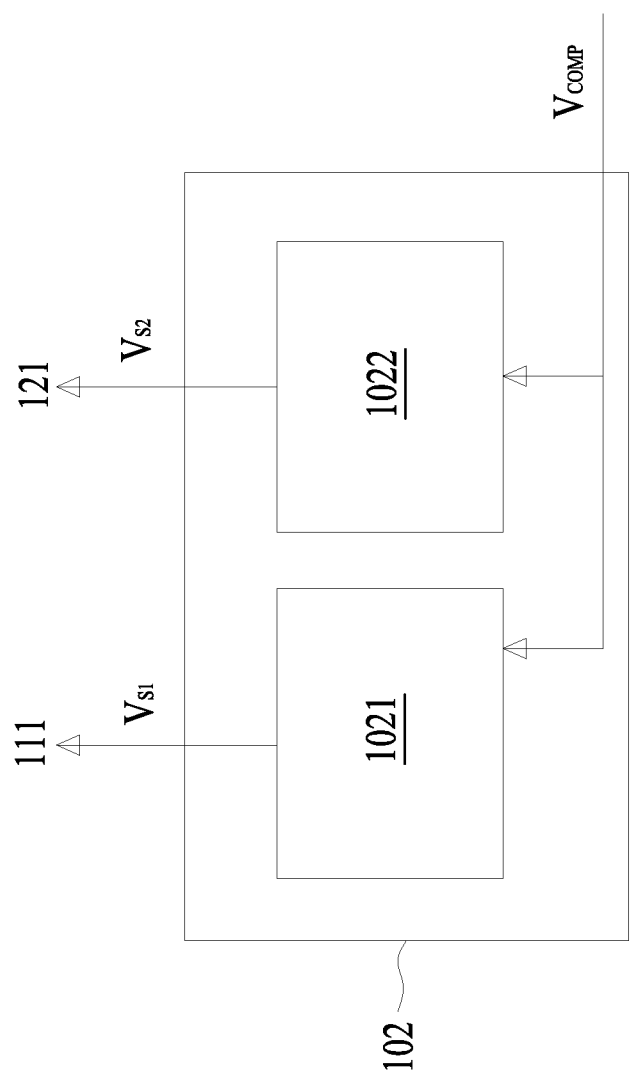
FIG. 2 illustrates the controller of the first embodiment of the present invention.

FIG. 2 illustrates the controller 102 of the power supply 100 of the first embodiment of the present invention including a first sub-control unit 1021 and a second sub-control unit 1022.

The first sub-control unit 1021 has an initial setting (not shown) and electrically connects to the first switch 111. The first sub-control unit 1021 generates a first control signal $V_{S1}$ according to both the initial setting and the compensation voltage signal $V_{COMP}$, further, the first sub-control unit 1021 transmits the first control signal $V_{S1}$ to the first switch 111.

The second sub-control unit 1022 electrically connects to the second switch 121. The second sub-control unit 1022 produces a second control signal $V_{S2}$ according to the compensation voltage signal $V_{COMP}$ and transmits the second control signal $V_{S2}$ to the second switch 121.

The first switch 111 and the second switch 121 can be MOSFET or JFET, furthermore, the first switch 111 and the second switch 121 can be a P-type transistor or a N-type transistor. The type of the first switch 111 and the second switch 121 can be configured according to the actual application, in other words, the first switch 111 and the second switch 121 are not limited to the specific forms described therein.

Figure 3:
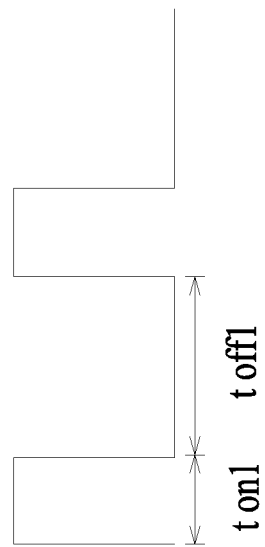
FIG. 3 illustrates the wave form of the control signal of the first embodiment of the present invention.

FIG. 3 illustrates that the first sub-control unit 1021 of the power supply 100 generates a first control signal $V_{S1}$ according to both the initial setting and the compensation voltage signal $V_{COMP}$. The turn-on time $t_{on1}$ of the first control signal $V_{S1}$ corresponds to the initial setting. Also, the turn-off time $t_{off1}$ of the first control signal $V_{S1}$ corresponds to the compensation voltage signal $V_{COMP}$.

The first sub-control unit 1021 controls the turn-on duration of the first switch 111 by the turn-on time $t_{on1}$ of the first control signal $V_{S1}$. The second sub-control unit 1022 of the power supply 100 produces a second control signal $V_{S2}$ and transmits it to the second switch 121, thereafter the second sub-control unit 1022 controls the turn-on duration of the second switch 121 by the turn-on time of the second control signal $V_{S2}$.

The first circuit 11 of the power supply 100 of the present embodiment can be a PFC circuit and the second circuit 12 of the power supply 100 of the present embodiment can be a power circuit. Further, the first circuit 11 and the second circuit 12 can be configured according to the actual application, and not limited to the specific forms described therein.

Thus, the power supply 100 of the first embodiment can control both the first circuit 11 and the second circuit 12 at the same time by the single feedback signal $V_{COMP}$. Accordingly, the power supply 100 of the present invention not only can simplify the circuit design, save the component cost, and decrease the circuit size, but also maintain both the stability and the efficiency of the power supply.

Figure 4:
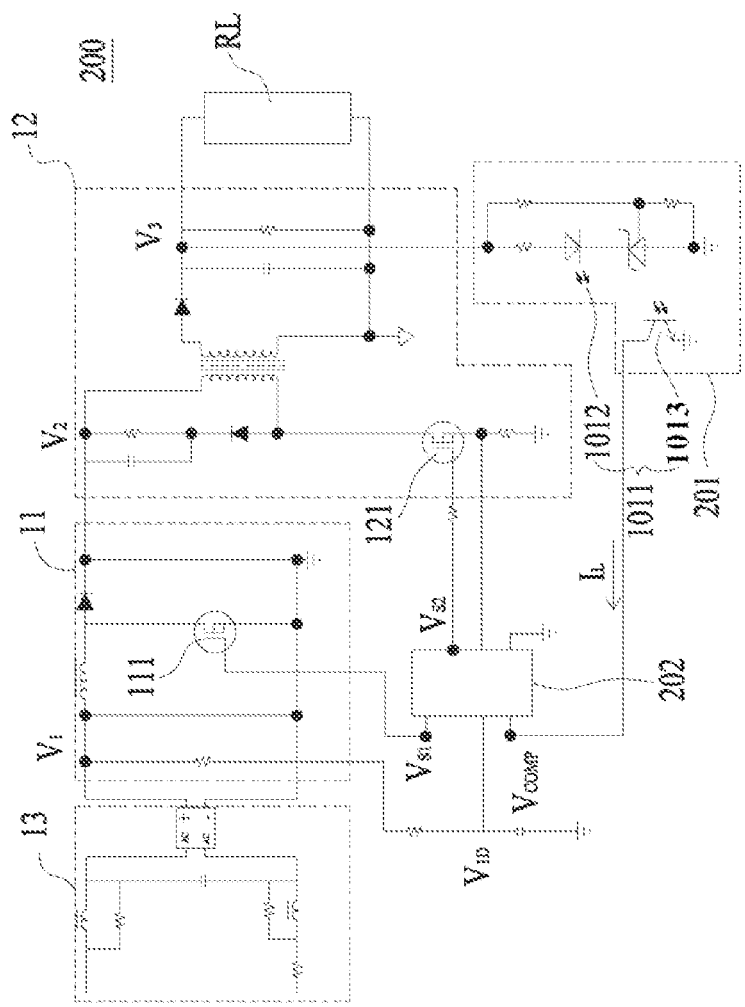
FIG. 4 illustrates the power supply of the second embodiment of the present invention

FIG. 4 illustrates the power supply 200 of the second embodiment of the present invention. Referring to FIG. 4, the power supply 200 includes a first circuit 11, a second circuit 12, a feedback circuit 201 and a controller 202.

The feedback circuit 201 has an optical coupler 1011 including a light-emitting part 1012 and a light-receiving part 1013. The light-emitting part 1012 electrically connects to the output voltage $V_3$ and the light-receiving part 1013 electrically connects to the controller 202.

The light-emitting part 1012 radiates a light corresponding to the output voltage $V_3$, and then the light-receiving part 1013 accepts the light and produces a corresponding photoelectric current signal $I_L$, furthermore, the light-receiving part 1013 transmits the photoelectric current signal $I_L$ to the controller 202, so the controller 202 produces the compensation voltage signal $V_{COMP}$ according to the photoelectric current signal $I_L$.

Although, the principal function of the feedback circuit 201 is carried out by the optical coupler 1011 in the second embodiment, the detailed form of the feedback circuit in other embodiments can be modulated according to the actual application, so the feedback circuit is not limited to the specific forms described therein.

Referring to FIG. 4, the controller 202 of the power supply 200 further electrically connects to the input voltage $V_1$. A partial voltage $V_{1D}$ is partially divided from the input voltage $V_1$ by the resistances.

The variation of the partial voltage $V_{1D}$ corresponds to the variation of the input voltage $V_1$, so the controller 202 fetches the variation of the partial voltage $V_{1D}$ to detect the variation of the input voltage $V_1$.

Figure 5:
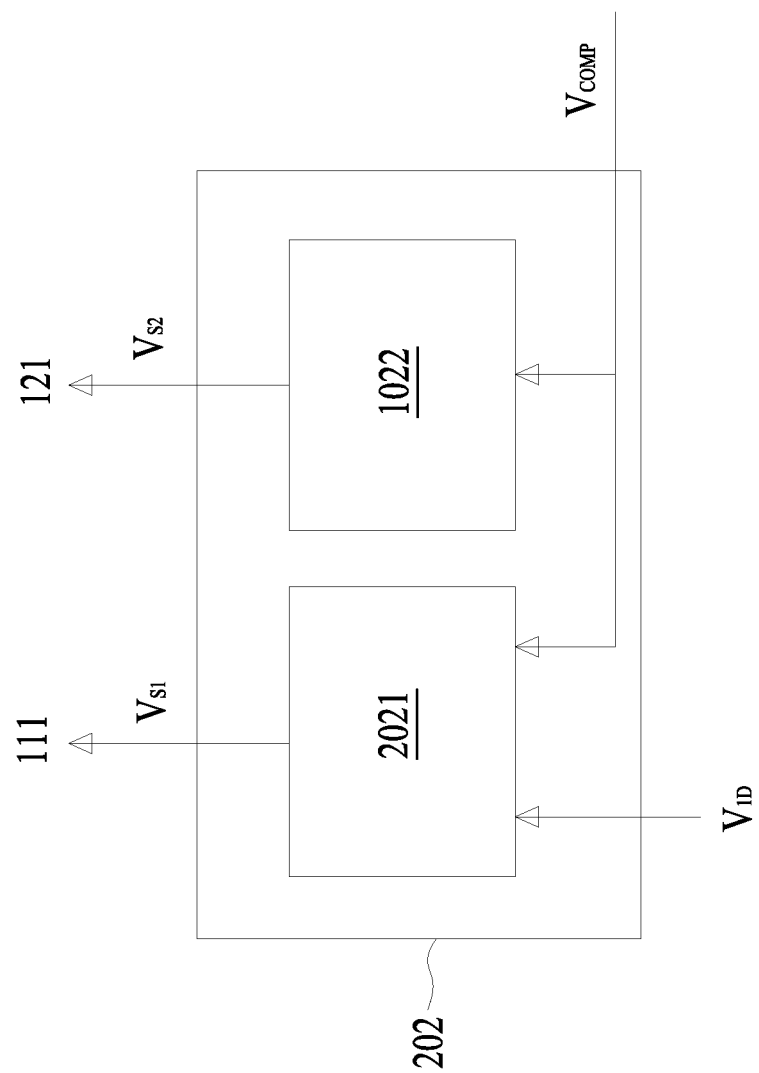
FIG. 5 illustrates the controller of the second embodiment of the present invention.

Referring to FIG. 5, the first sub-control unit 2021 of the controller 202 of the power supply 200 not only generates the first control signal $V_{S1}$ according to both the initial setting and the compensation voltage signal $V_{COMP}$ but also detects the variation of the input voltage $V_1$ according to the variation of the partial voltage $V_{1D}$, furthermore, the first sub-control unit 2021 modulates the turn-on time $t_{on1}$ of the first control signal $V_{S1}$ according to the variation of the partial voltage $V_{1D}$.

Figure 6:
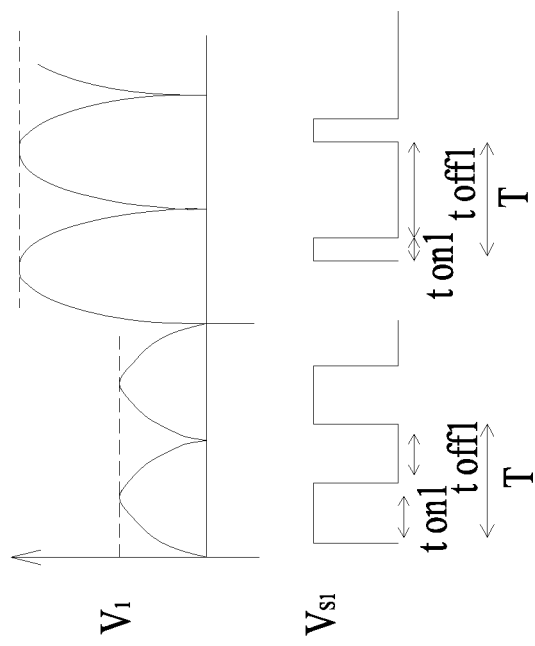
FIG. 6 illustrates the wave form of the control signal of the second embodiment of the present invention.

Referring to FIG. 6, the turn-on time t of the first control signal $V_{S1}$ is not only corresponding to the initial setting but also regulated by the partial voltage $V_{1D}$ according to the variation of the input voltage $V_1$, thus the turn-on time $t_{on1}$ of the first control signal $V_{S1}$ decreases with the increase of the input voltage $V_1$.

The first circuit 11 of the power supply 200 of the present embodiment can be a PFC circuit and the second circuit 12 of the power supply 200 of the present embodiment can be a power circuit. Further, the first circuit 11 and the second circuit 12 can be configured according to the actual application, and not limited to the specific forms described therein.

Accordingly, the power supply 200 of the second embodiment can control both the first circuit 11 and the second circuit 12 at the same time by the single feedback signal $V_{COMP}$. Furthermore, the power supply 200 features a design with the protection circuit that regulates the turn-on time $t_{on1}$ of the first circuit 11 according to the variation of the input voltage $V_1$.

Thereafter, the power supply 100 of the present invention not only can simplify the circuit design, save the component cost, decrease the circuit size, but also maintain both the stability and the efficiency of the power supply.

Figure 7:
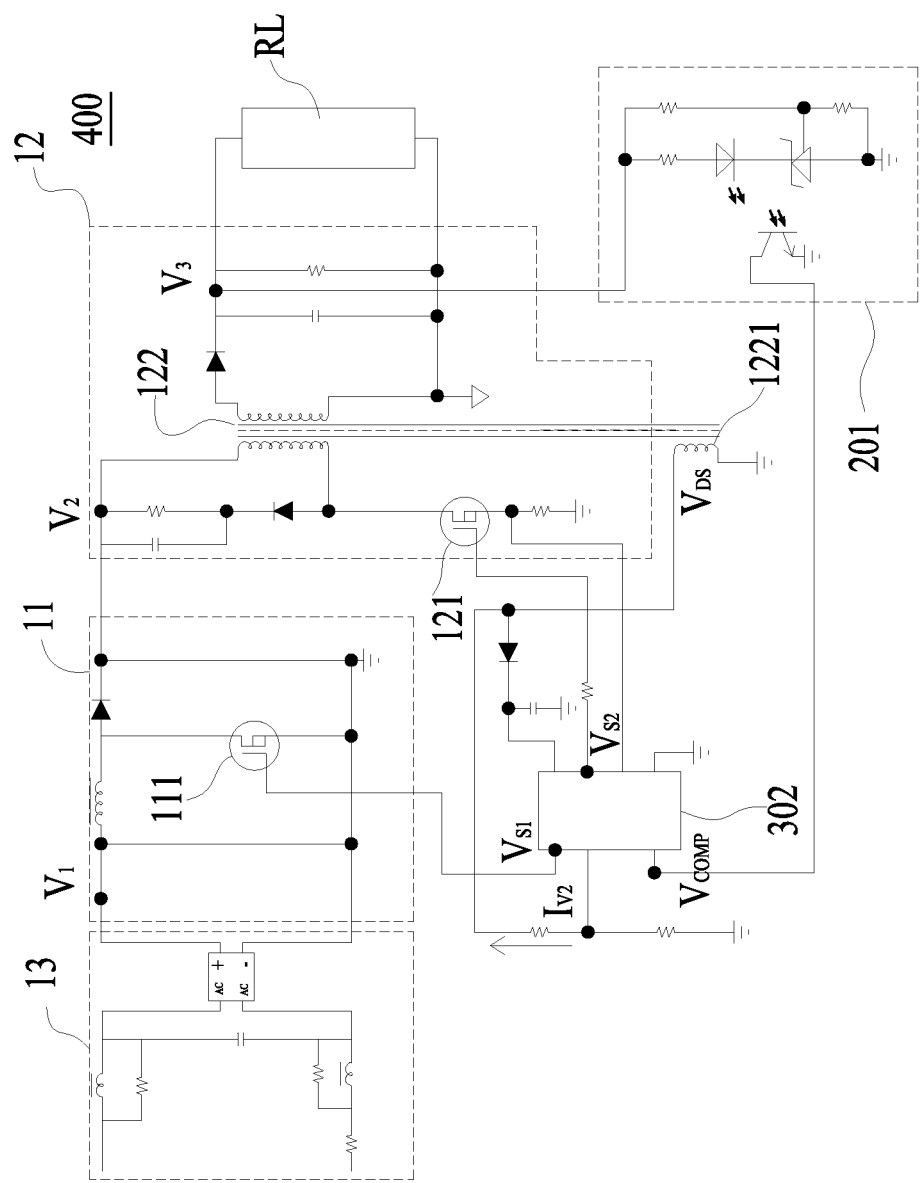
FIG. 7 illustrates the power supply of the third embodiment of the present invention.

FIG. 7 illustrates the power supply 300 of the third embodiment of the present invention. Referring to FIG. 7, the power supply 300 includes a first circuit 11, a second circuit 12, a feedback circuit 201, a controller 302 and an auxiliary coil 1221.

The second circuit 12 further has a transformer 122, and the auxiliary coil 1221 is arranged on a primary side of the transformer 122. The auxiliary coil 1221 couples to the middle voltage $V_2$ and electrically connects to the controller 302, so the variation of the middle voltage $V_2$ produces a current signal $I_{V2}$ correspondingly on the auxiliary coil 1221. Furthermore, the controller 302 modulates the turn-on time $t_{on1}$ of the first control signal $V_{S1}$ according to the variation of the current signal $I_{V2}$.

The principle of the third embodiment is that the variation of the middle voltage $V_2$ produces an induced voltage $V_{DS}$ correspondingly on the auxiliary coil 1221 of the transformer 122, then the induced voltage $V_{DS}$ produces the current signal $I_{V2}$ by the voltage division resistor correspondingly.

Thereafter, the controller 302 of the power supply 300 detects the variation of the current signal $I_{V2}$ to judge the variation of the middle voltage $V_2$, so the controller 302 modulates the turn-on time t of the first control signal $V_{S1}$ according to the variation of the current signal $I_{V2}$. Also, the turn-on time $t_{on1}$ of the first control signal $V_{S1}$ decreases with the increase of the middle voltage $V_2$.

Figure 8:
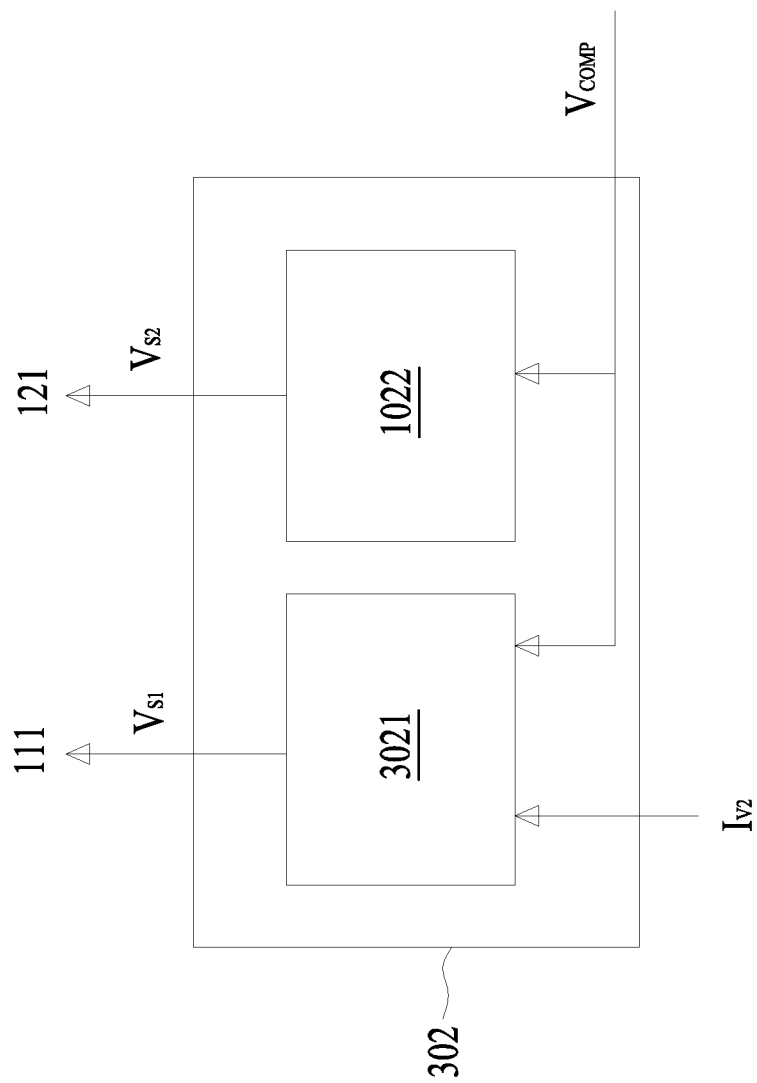
FIG. 8 illustrates the controller of the third embodiment of the present invention.

Referring to FIG. 8, the first sub-control unit 3021 of the controller 302 of the power supply 300 not only generates a first control signal $V_{S1}$ according to both the initial setting and the compensation voltage signal $V_{COMP}$ but also detects the variation of the middle voltage $V_2$ via the auxiliary coil 1221 of the transformer 122.

The first circuit 11 of the power supply 300 of the present embodiment can be a PFC circuit and the second circuit 12 of the power supply 300 of the present embodiment can be a power circuit. Further, the first circuit 11 and the second circuit 12 can be configured according to the actual application, and not limited to the specific forms described therein.

Thus, the power supply 300 of the second embodiment can control both the first circuit $I_{on1}$ and the second circuit 12 at the same time by the single feedback signal $V_{COMP}$. Furthermore, the power supply 300 features a design with the protection circuit that regulates the turn-on time t of the first circuit 11 according to the variation of the middle voltage $V_2$. Thereafter, the power supply 300 of the present invention not only can simplify the circuit design, save the component cost, decrease the circuit size, but also maintain both the stability and the efficiency of the power supply.

Figure 9:
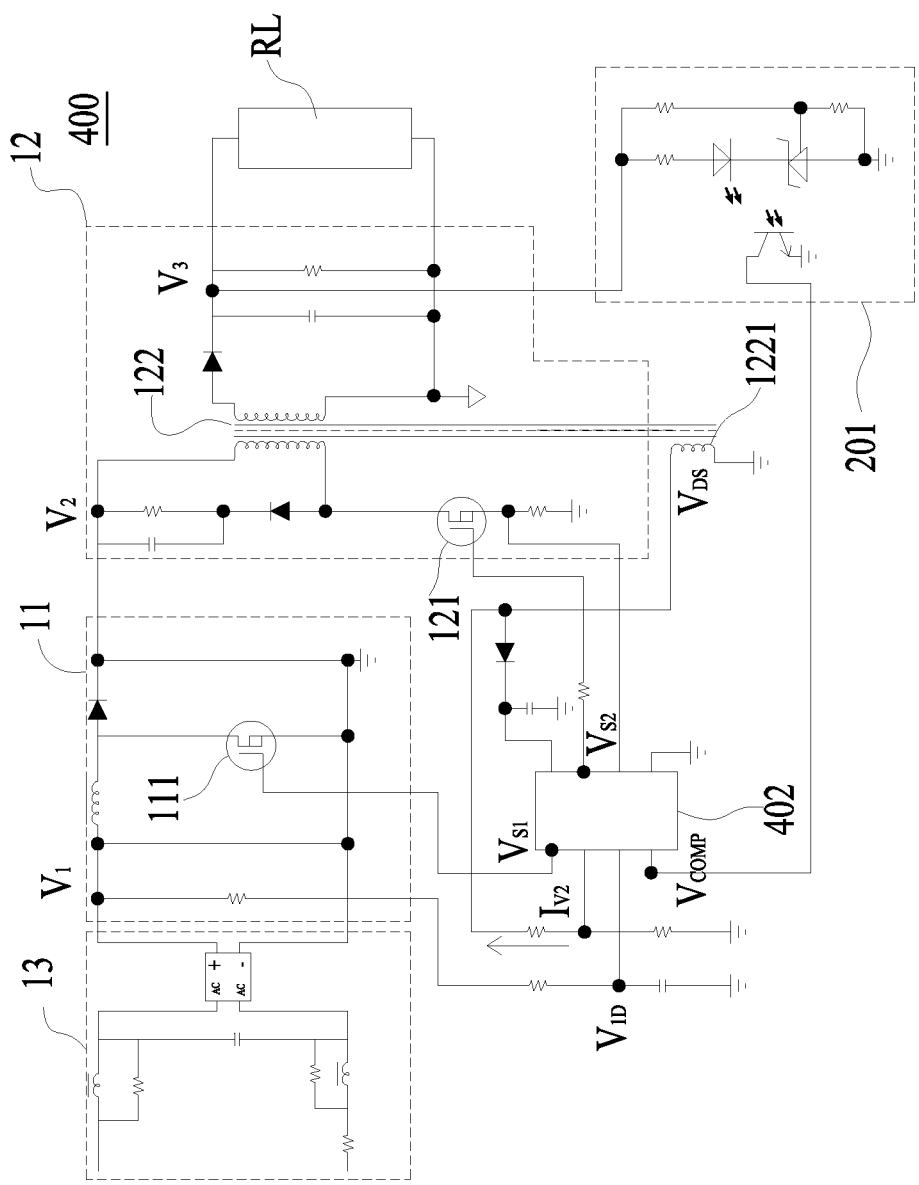
FIG. 9 illustrates the power supply of the fourth embodiment of the present invention.

FIG. 9 illustrates the power supply 300 of the fourth embodiment of the present invention. Referring to FIG. 9, the power supply 400 includes a first circuit 11, a second circuit 12, a feedback circuit 201, a controller 402 and an auxiliary coil 1221.

As the aforesaid description, the first sub-control unit 4021 of the controller 402 of the power supply 400 not only generates the first control signal $V_{S1}$ according to both the initial setting and the compensation voltage signal $V_{COMP}$ but also detects the variation of the input voltage $V_1$ according to the variation of the partial voltage $V_{1D}$, further the first sub-control unit 2021 modulates the turn-on time $t_{on1}$ of the first control signal $V_{S1}$ according to the variation of the partial voltage $V_{1D}$.

In addition, the first sub-control unit 4021 of the controller 402 further detects the variation of the middle voltage $V_2$ via the auxiliary coil 1221 at the same time, and then modulates the turn-on time $t_{on1}$ of the first control signal $V_{S1}$ according to the variation of the current signal $I_{V2}$.

The first circuit 11 of the power supply 400 of the present embodiment can be a PFC circuit and the second circuit 12 of the power supply 400 of the present embodiment can be a power circuit. Further, the first circuit 11 and the second circuit 12 can be configured according to the actual application, and not limited to the specific forms described therein.

Referring to FIG. 1 and FIG. 2, the present invention further discloses a controller 102 which is applicable to a power supply 100 including a first circuit 11, a second circuit 12 and a feedback circuit 101. The controller 102 can control both the first circuit 11 and the second circuit 12 of the power supply 100 at the same time by the single feedback signal, the compensation voltage signal $V_{COMP}$.

Referring FIG. 4 and FIG. 5, the present invention further discloses a controller 202 which can detect the variation of the input voltage $V_1$ of the first circuit 11 and modulate the controlling of the first circuit 11 according to a design with the protection circuit.

Referring FIG. 7 and FIG. 8, the present invention further discloses a controller 302 which can detect the variation of the middle voltage $V_2$ of the first circuit 11 and modulate the controlling of the first circuit 11 according to a various design with the protection circuit.

Figure 10:
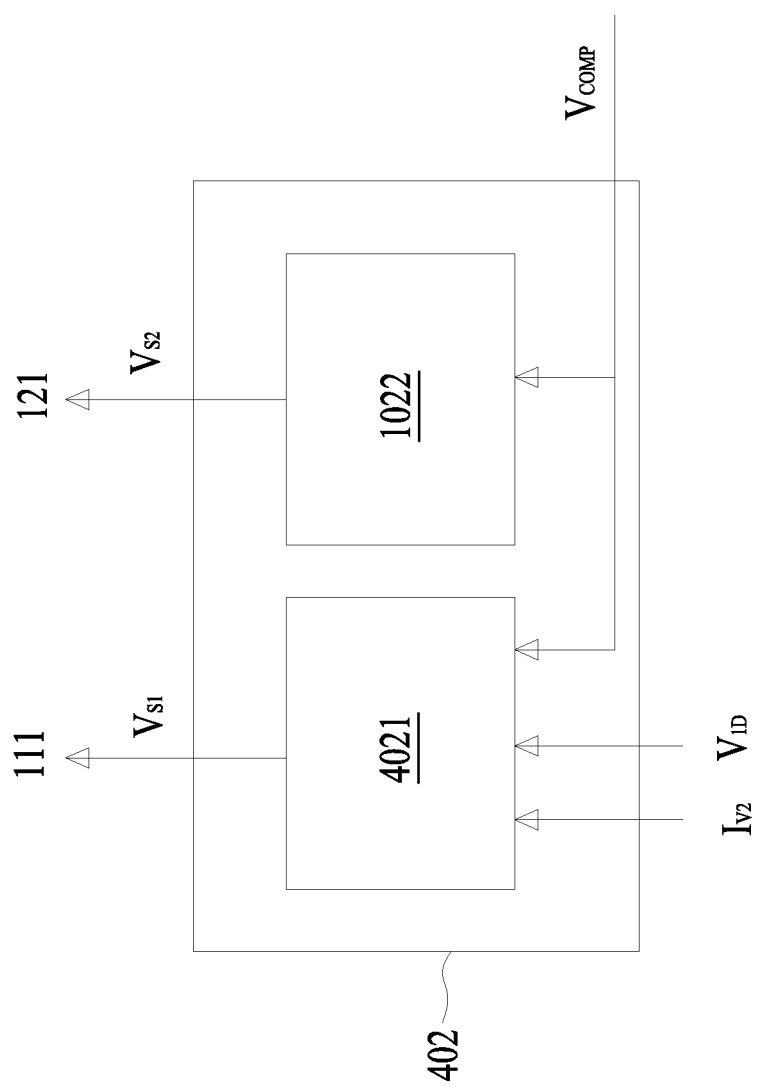
FIG. 10 illustrates the controller of the fourth embodiment of the present invention.

Referring FIG. 9 and FIG. 10, the present invention further discloses a controller 402 which can detect both the variation of the input voltage $V_1$ and the variation of the middle voltage $V_2$ of the first circuit 11 at the same time and modulate the controlling of the first circuit 11 according to a various design with the protection circuit.

Thereafter, the controllers of the present invention not only can simplify the circuit design, save the component cost, decrease the circuit size, but also maintain both the stability and the efficiency of the power supply.

Figure 11:
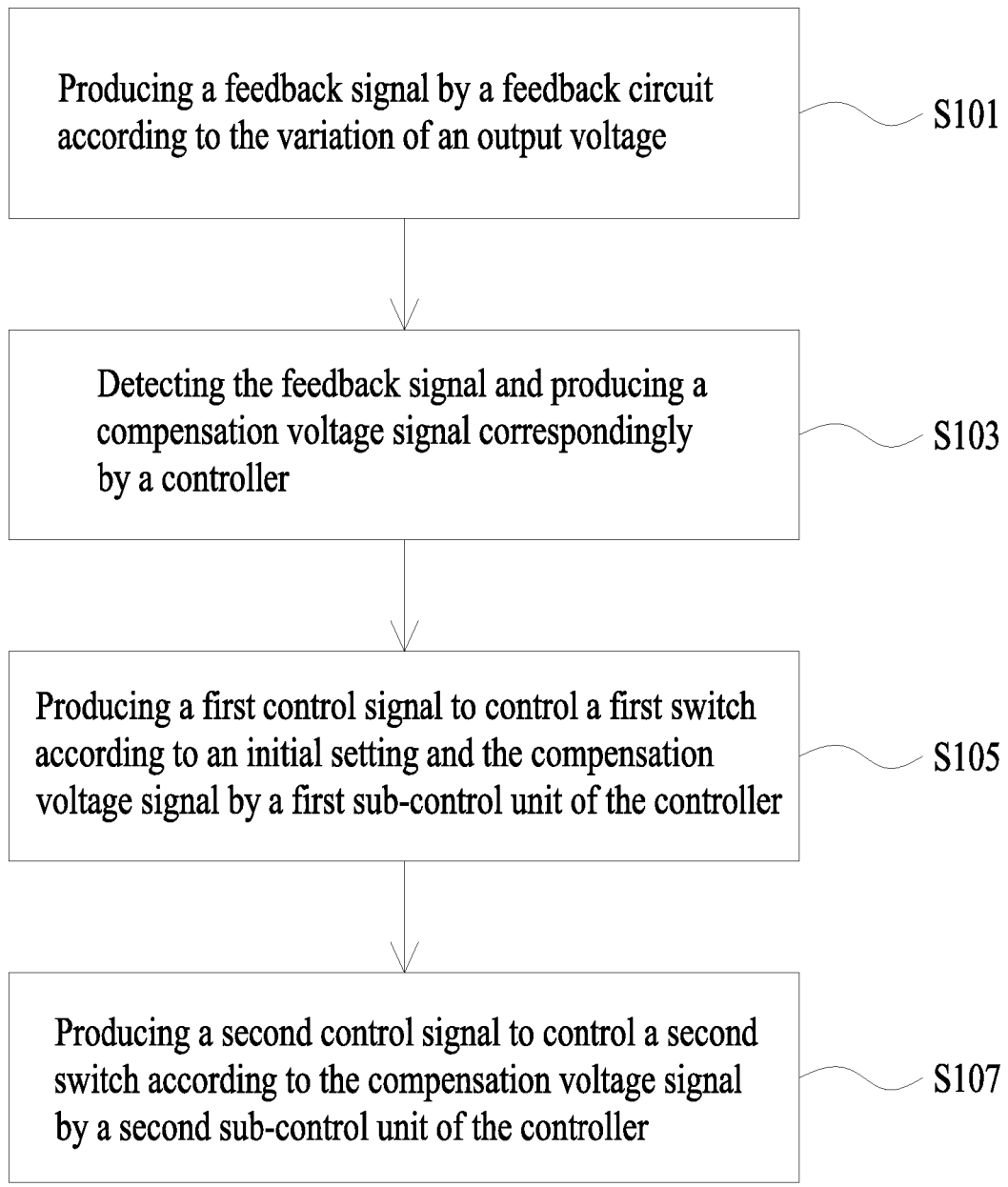
FIG. 11 illustrates the flow chart of a control method of the first embodiment of the present invention.

Referring to FIG. 1, FIG. 2 and FIG. 11, the present invention discloses a method of controlling the power supply. FIG. 11 illustrates the control method of the first embodiment of the present invention including the following steps.

First, Step S101 describes the process that a feedback circuit 101 produces a feedback signal according to the variation of an output voltage $V_3$. Step S103 describes the process that a controller 102 detects the feedback signal and produces a corresponding compensation voltage signal $V_{COMP}$. Step S105 describes the process that a first sub-control unit 1021 of the controller 102 has an initial setting and generates a first control signal $V_{S1}$ according to both the initial setting and the compensation voltage signal $V_{COMP}$ to control a first switch 111. Step S107 describes the process that a second sub-control unit 1022 of the controller 102 generates a second control signal $V_{S2}$ according to the initial setting to control a second switch 121.

The control method of the present invention performs by the way of single feedback control, in other words, the first sub-control unit 1021 and the second sub-control unit 1022 of the controller 102 generates the first control signal $V_{S1}$ and the second control signal $V_{S2}$ individually to control the first circuit 11 and the second circuit 12 separately according to the compensation voltage signal $V_{COMP}$ only.

The turn-on time $t_{on1}$ of the first control signal $V_{S1}$ corresponds to the initial setting and the turn-off time $t_{off1}$ of the first control signal $V_{S1}$ corresponds to the amplitude of the compensation voltage signal $V_{COMP}$ in the control method of the present invention. Thus, the turn-on time of the first control signal $V_{S1}$ and the second control signal $V_{S2}$ control the turn-on duration of the first switch 111 and the second switch 121 respectively.

In addition, the first control signal $V_{S1}$ controls the first switch 111 so that the first circuit 11 operates in the Discontinuous Conduction Mode (DCM) in the control method disclosed in the present invention. There are several types of the PFC circuit according to various control principles, such as the critical-conduction mode (CRM) PFC, the Discontinuous Conduction Mode (DCM) PFC, the Continuous Conduction Mode (CCM) PFC, the Frequency Clamped Critical conduction (FCCrM) PFC and so on.

The principal advantages of the DCM are higher active current, lower coil inductance and more stability, so the DCM is commonly used in the middle or low power application. Furthermore, the main feature of the DCM is that the switch works while the working current on the inductance decreases to zero.

Thereafter, the present invention discloses a control method which enables the first circuit 11 to work in the DCM for the sake of the performance of both the power factor and the conversion efficiency. To work in the DCM not only maintains appropriate performance of the power factor but also reduces the loss caused between the switch.

Figure 12:
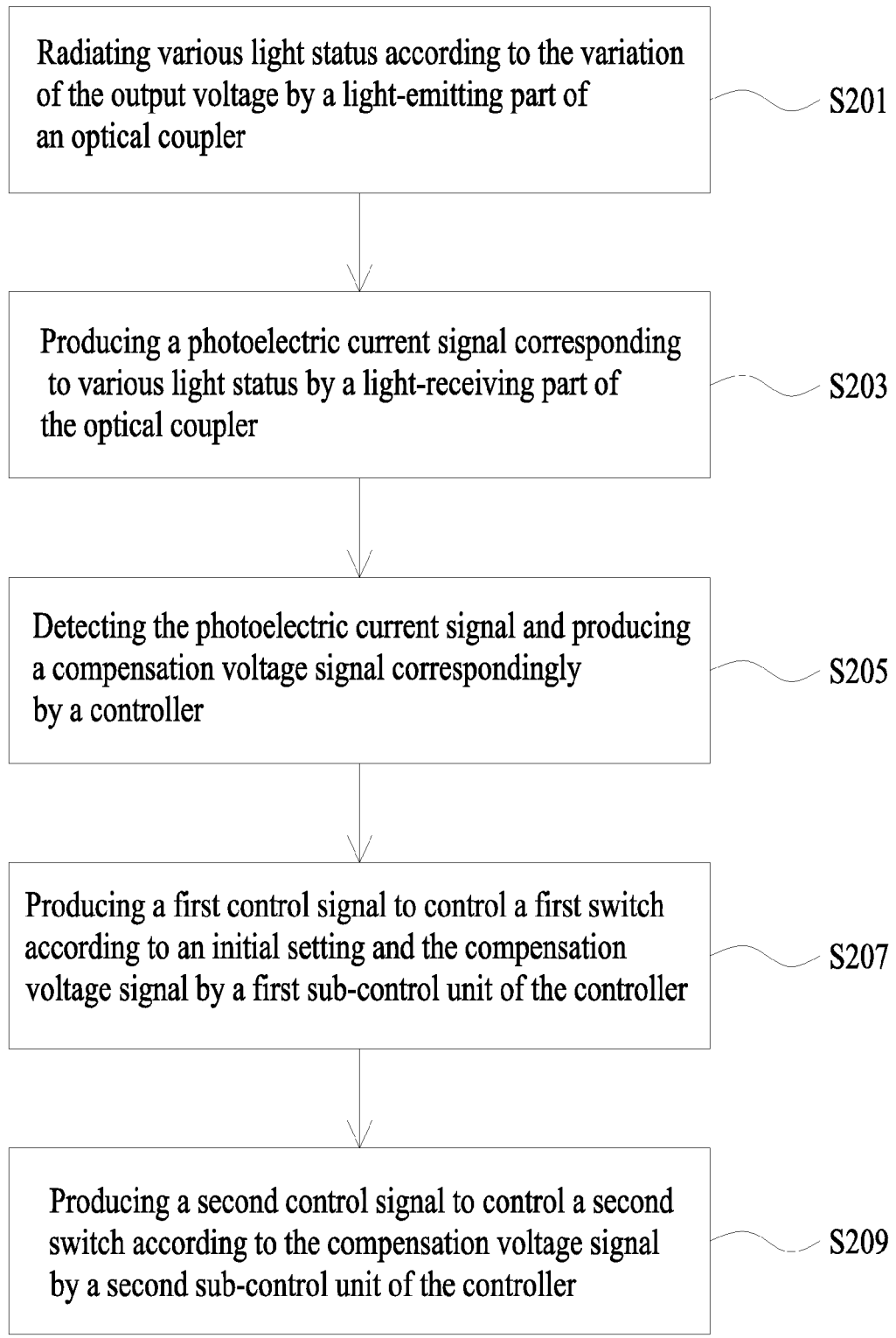
FIG. 12 illustrates the flow chart of a control method of the second embodiment of the present invention.

Referring to FIG. 4, FIG. 5 and FIG. 12, the present invention discloses a control method of the power supply. FIG. 12 illustrates the control method of the second embodiment of the present invention including the following steps. First, Step 201 describes the process that an optical coupler 1011 of the feedback circuit 201 detects the output voltage $V_3$ and a light-emitting part 1012 of the optical coupler 1011 radiates a light corresponding to the output voltage $V_3$. Step 203 describes the process that a light-receiving part 1013 of the optical coupler 1011 accepts the light and produces a corresponding photoelectric current signal $I_L$. Step S205 describes the process that a controller 202 produces the compensation voltage signal $V_{COMP}$ according to the photoelectric current signal $I_L$.

In the control method of the present embodiment in FIG. 10, Step S207 is similar to aforesaid Step S105 and Step S209 is similar to aforesaid Step S107.

Although, the principal function of the feedback circuit 201 is carried out by the optical coupler 1011 in the present embodiment, the methods of detecting the feedback signal and producing the compensation voltage signal $V_{COMP}$ can be regulated according to the actual application. Thus the methods are not limited to those described therein. Thereafter, Steps S201, S203 and S205 of the present embodiment can be the concrete description of the Steps S101 and S103 of the former embodiment.

Figure 13:
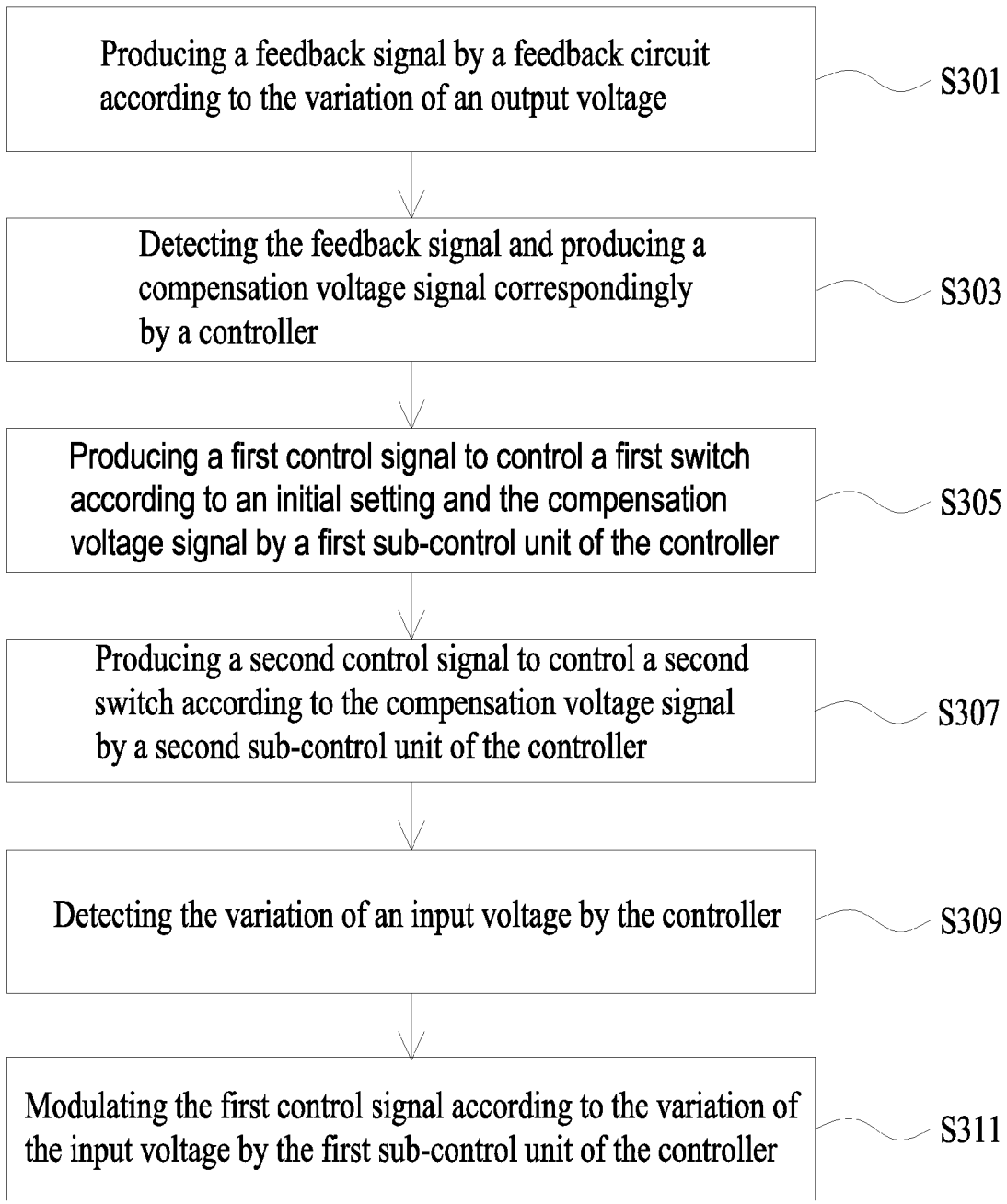
FIG. 13 illustrates the flow chart of a control method of the second embodiment of the present invention.

Referring to FIG. 4, FIG. 5 and FIG. 13, the control method of the second embodiment of the present invention further includes the following steps. Step S309 describes the process that the controller 202 detects a variation of the input voltage $V_1$, and Step S311 describes the process that the first sub-control unit 2021 modulates the first control signal $V_{S1}$ according to the variation of the input voltage $V_1$.

In the control method of the present embodiment in FIG. 11, Step S301 is similar to aforesaid Step S101, Step S305 is similar to aforesaid Step S105 and Step S307 is similar to aforesaid Step S107.

In addition, the feedback signal can be generated by the optical coupler as the feedback circuit. Thereafter, Steps S201, S203 and S205 of the aforesaid embodiment can be the concrete description of the Steps S301 and S303 of the present embodiment. Moreover, the first sub-control unit 2021 of the controller 202 reduces the turn-on time t of the first control signal $V_{S1}$ with the increase of the input voltage $V_1$.

Figure 14:
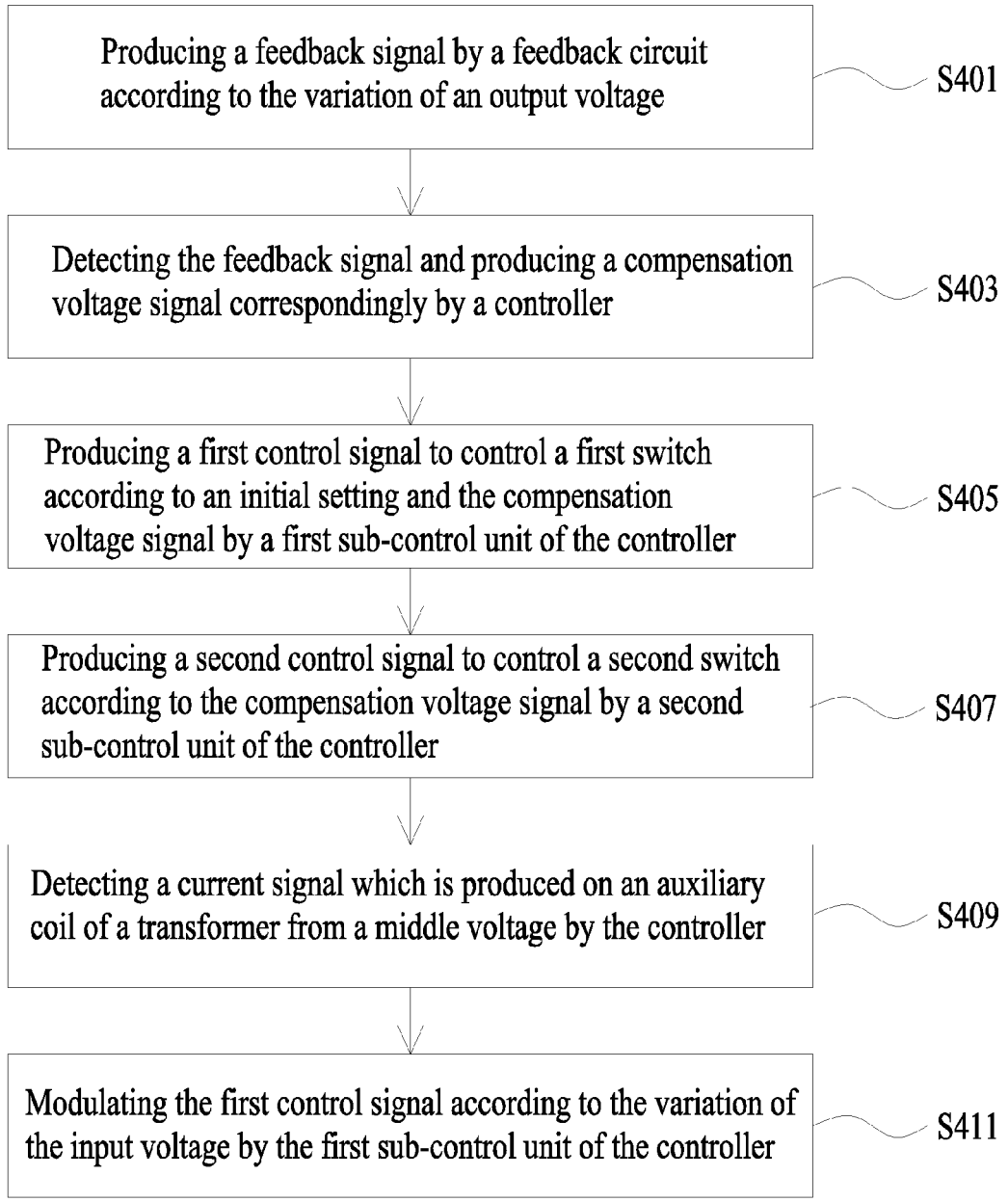
FIG. 14 illustrates the flow chart of a control method of the third embodiment of the present invention.

Referring to FIG. 7, FIG. 8 and FIG. 14, the control method of the third embodiment of the present invention further includes the following steps. Step S409 describes the process that the controller 302 detects a current signal $I_{V2}$ produced on an auxiliary coil 1221 of a transformer 122 from a middle voltage $V_2$. Step S411 describes the process that the first sub-control unit 3021 of the controller 302 modulates the first control signal $V_{S1}$ according to the current signal $I_{V2}$.

In the control method of the present embodiment in FIG. 14, Step S401 is similar to aforesaid Steps S101 and S301; Step S403 is similar to aforesaid Steps S103 and S303; Step S405 is similar to aforesaid Steps S105 and S305; Step S407 is similar to aforesaid Steps S107 and S307.

In addition, the feedback signal can be generated by the optical coupler as the feedback circuit. Thereafter, Steps S201, S203 and S205 of the aforesaid embodiment can be the concrete description of the Steps S401 and S403 of the present embodiment.

Moreover, the first sub-control unit 3021 of the controller 302 reduces the turn-on time $t_{on1}$ of the first control signal $V_{S1}$ with the increase of the current signal $I_{V2}$.

Figure 15:
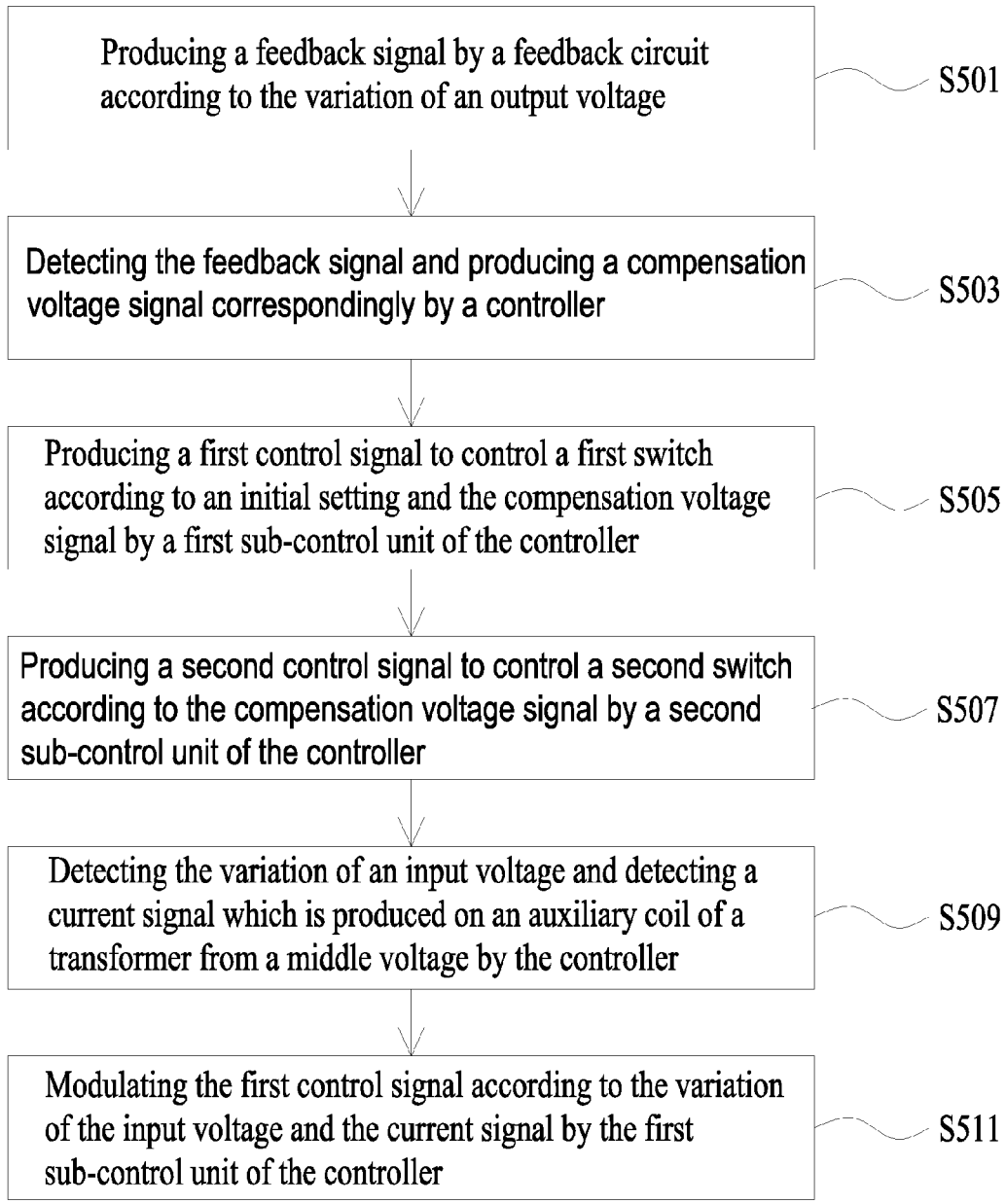
FIG. 15 illustrates the flow chart of a control method of the fourth embodiment of the present invention.

Referring to FIG. 9, FIG. 10 and FIG. 15, the control method of the fourth embodiment of the present invention further includes the following steps. Step S509 describes the process that the controller 402 detects a variation of the input voltage $V_1$ and detects a current signal $I_{V2}$ produced from a middle voltage $V_2$ on an auxiliary coil 1221 of a transformer 122. Step S511 describes the process that the first sub-control unit 4021 of the controller 402 modulates the first control signal $V_{S1}$ according to both the variation of the input voltage $V_1$ and the variation of the middle voltage $V_2$.

In the control method of the present embodiment in FIG. 15, Step S501 is similar to aforesaid Steps S101, S301 and S401; Step S503 is similar to aforesaid Steps S103, S303 and S403; Step S505 is similar to aforesaid Steps S105, S305 and S405; Step S507 is similar to aforesaid Steps S107, S307 and S407.

Moreover, the first sub-control unit 4021 of the controller 402 reduces the turn-on time $t_{on1}$ of the first control signal $V_{S1}$ with both the increase of the current signal $I_{V2}$ and the increase of the input voltage $V_1$.

In addition, the feedback signal can be generated by the optical coupler as the feedback circuit in the present embodiment of the control method. Thereafter, Steps S201, S203 and S205 of the aforesaid embodiment can be the concrete description of the Steps S501 and S503 of the present embodiment.

The control method disclosed by the embodiment of the present invention controls both the first circuit and the second circuit of the power supply at the same time by the single feedback signal, i.e. the compensation voltage signal $V_{COMP}$.

The controller 102 further detects the variation of the input voltage $V_1$ and the variation of the middle voltage $V_2$ of the first circuit 11 respectively to modulate the turn-on duration of the first circuit 11 according to the different protection circuit designs.

Thereafter, the control method of the present invention can simplify the circuit design, save the component cost, and decrease the circuit size.

Moreover, the control method of the present invention limits the PFC circuit to work in DCM, so the switch works only when the working current decreases to zero. The control method of the present invention not only reduces the loss caused between the switch but also maintains both the stability and the efficiency of the power supply.

The underlying Table 1 shows the relative data simulated by the software, and it is obvious that power factor exceeds 0.9 under both the high level AC input and the low level AC input. Thus, the power supply, the controller and the control method accomplish the purpose and the effect of the present invention.

TABLE 1

| Vac(V) | Iac(mA) | Pin(W) | PF | V2(V) |
|--------|---------|--------|------|-------|
| 115 | 0.873 | 98.92 | 0.99 | 288 |
| 115 | 0.542 | 61.16 | 0.98 | 283 |
| 230 | 0.458 | 98.20 | 0.93 | 403 |
| 230 | 0.288 | 59.78 | 0.90 | 395 |

While the disclosure has been described in terms of what is presently consider to be the preferred embodiments, it is to be understood that the disclosure needs not be limited to the disclosed embodiment. On the contrary, it is intended cover various modifications and similar arrangements included within the spirit and scope of the appended claims which are to be accorded with the broadest interpretation so as to encompass all such modification and similar structures. It is therefore intended by the appended claims to define the true scope of the invention.

The invention claimed is:

1. A power supply comprising:
   a first circuit comprising a first switch which transforms an input voltage to a middle voltage;
   a second circuit comprising a second switch which transforms a middle voltage to an output voltage;
   a feedback circuit electrically connecting to the output voltage; and
   a controller electrically connecting to the feedback circuit, producing a compensation voltage signal corresponding to the output voltage, and the controller comprising:
   a first sub-control unit electrically connecting to the first switch, wherein the first sub-control unit has an initial setting, and produces a first control signal according to the initial setting and the compensation voltage signal, further the first sub-control unit transmits the first control signal to the first switch; and
   a second sub-control unit electrically connecting to the second switch, wherein the second sub-control unit produces a second control signal according to the compensation voltage signal, and transmits the second control signal to the second switch,
   wherein the first sub-control unit decides a turn-on time of the first control signal according to the initial setting, and the first sub-control unit decides a turn-off time of the first control signal according to the compensation voltage signal.

2. The power supply of claim 1, wherein the feedback circuit comprises an optical coupler, further the optical coupler comprises a light-emitting part and a light-receiving part, the light-emitting part electrically connects to the output voltage and the light-receiving part electrically connects to the controller, further the light-emitting part radiates a light corresponding to the output voltage, so the light-receiving part accepts the light and produces a corresponding photoelectric current signal then transmits the photoelectric current signal to the controller, therefore the controller produces the compensation voltage signal according to the photoelectric current signal.

3. The power supply of claim 1, wherein the controller further electrically connects to the input voltage, and the first sub-control unit of the controller regulates the turn-on time of the first control signal according to the variation of the input voltage.

4. The power supply of claim 3, wherein the turn-on time of the first control signal decreases with the increase of the input voltage.

5. The power supply of claim 4, further comprising an auxiliary coil coupling to the middle voltage and electrically connecting the controller, wherein the second circuit further comprises a transformer, and the auxiliary coil is arranged on a primary side of the transformer, so the variation of the middle voltage produces a current signal correspondingly on the auxiliary coil, then the controller regulates the turn-on time of the first control signal according to the variation of the current signal.

6. The power supply of claim 5, wherein the turn-on time of the first control signal decreases with the increase of the current signal.

7. The power supply of claim 6, wherein the first circuit is a power factor corrector circuit, and the second circuit is a power circuit.

8. The power supply of claim 1, further comprising an auxiliary coil coupling to the middle voltage and electrically connecting to the controller, wherein the second circuit further comprises a transformer, and the auxiliary coil is arranged on a primary side of the transformer, so the variation of the middle voltage produces a current signal correspondingly on the auxiliary coil, then the controller regulates the turn-on time of the first control signal according to the variation of the current signal.

9. The power supply of claim 8, wherein the turn-on time of the first control signal decreases with the increase of the current signal.

10. The power supply of claim 9, wherein the first circuit is a power factor corrector circuit, and the second circuit is a power circuit.

11. A controller being applicable to a power supply which comprises a first circuit, a second circuit and a feedback circuit, wherein the first circuit has a first switch and the second circuit has a second switch, further the first circuit transforms an input voltage to a middle voltage, and the second circuit transforms the middle voltage to an output voltage, the feedback circuit electrically connects to the output voltage and the controller, the controller comprising:
   a first sub-control unit electrically connecting to the first switch, wherein the first sub-control unit has an initial setting; and
   a second sub-control unit electrically connecting to the second switch;
   wherein the controller produces a compensation voltage signal corresponding to the output voltage, and the first sub-control unit produces a first control signal according to the initial setting and the compensation voltage signal to control the first switch, further the second sub-control unit produces a second control signal according to the compensation voltage signal to control the second switch, wherein the first sub-control unit decides a turn-on time of the first control signal according to the initial setting, and the first sub-control unit decides a turn-off time of the first control signal according to the compensation voltage signal.

12. The controller of claim 11, wherein the controller further electrically connects to the input voltage, and the first sub-control unit of the controller regulates the turn-on time of the first control signal according to the variation of the input voltage.

13. The controller of claim 12, wherein the turn-on time of the first control signal decreases with the increase of the input voltage.

14. The controller of claim 13, wherein the second circuit further has a transformer, and the transformer has an auxiliary coil which is arranged on the primary side of the transformer, further the auxiliary coil couples to the middle voltage and electrically connects to the controller, so the variation of the middle voltage produces a current signal correspondingly on the auxiliary coil, then the controller regulates the turn-on time of the first control signal according to the variation of the current signal.

15. The controller of claim 14, wherein the turn-on time of the first control signal decreases with the increase of the current signal.

16. The controller of claim 11, wherein the second circuit further has a transformer, and the transformer has an auxiliary coil which is arranged on the primary side of the transformer, further the auxiliary coil couples to the middle voltage and electrically connects to the controller, so the variation of the middle voltage produces a current signal correspondingly on the auxiliary coil, then the controller regulates the turn-on time of the first control signal according to the variation of the current signal.

17. The controller of claim 16, wherein the turn-on time of the first control signal decreases with the increase of the current signal.

18. A method for controlling a power supply, the method comprising the following steps:
   producing a feedback signal by a feedback circuit according to the variation of an output voltage;
   detecting the feedback signal and producing a compensation voltage signal correspondingly by a controller;
   deciding a turn-on time of a first control signal according to an initial setting by the first sub-control unit of the controller;
   deciding a turn-off time of the first control signal according to the compensation voltage signal by the first sub-control unit;
   producing the first control signal to control a first switch by the first sub-control unit of the controller, further producing a middle voltage from correcting the power factor of an input voltage by the first switch; and
   producing a second control signal to control a second switch according to the compensation voltage signal by a second sub-control unit of the controller, further producing the output voltage from the middle voltage by the second switch.

19. The method of claim 18, further comprising the following steps:
   radiating various light status according to the variation of the output voltage by a light-emitting part of an optical coupler;
   producing a photoelectric current signal corresponding to various light status by a light-receiving part of the optical coupler; and
   detecting the photoelectric current signal and producing the compensation voltage signal correspondingly by a controller.

20. The method of claim 18, further comprising the following steps:
   controlling the first switch of the first circuit by the first control signal; and
   controlling the first circuit to operate in the Discontinuous Conduction Mode (DCM) by the first control signal.

21. The method of claim 18, further comprising the following steps:
   detecting the variation of the input voltage by the controller; and
   modulating the first control signal according to the variation of the input voltage by the first sub-control unit of the controller.

22. The method of claim 21, further comprising:
   decreasing the turn-on time of the first control signal with the increase of the input voltage by the first sub-control unit of the controller.

23. The method of claim 22, further comprising the following steps:
   detecting a current signal which is produced on an auxiliary coil of a transformer by the middle voltage; and
   modulating the first control signal according to the current signal by the first sub-control unit of the controller.

24. The method of claim 23, further comprising:
   decreasing the turn-on time of the first control signal with the increase of the current signal by the first sub-control unit of the controller.

25. The method of claim 18, further comprising the following steps:
   detecting a current signal which is produced on an auxiliary coil of a transformer by the middle voltage; and
   modulating the first control signal according to the current signal by the first sub-control unit of the controller.

26. The method of claim 25, further comprising:
   decreasing the turn-on time of the first control signal with the increase of the current signal by the first sub-control unit of the controller.

* * * * *